March 21, 1933. T. A. VERSTEGEN 1,902,428
CABIN FOR AIRCRAFT AND THE LIKE
Filed April 29, 1932   3 Sheets-Sheet 1

Inventor
T. A. Verstegen
By Clarence A. O'Brien
Attorney

March 21, 1933.  T. A. VERSTEGEN  1,902,428
CABIN FOR AIRCRAFT AND THE LIKE
Filed April 29, 1932  3 Sheets-Sheet 2
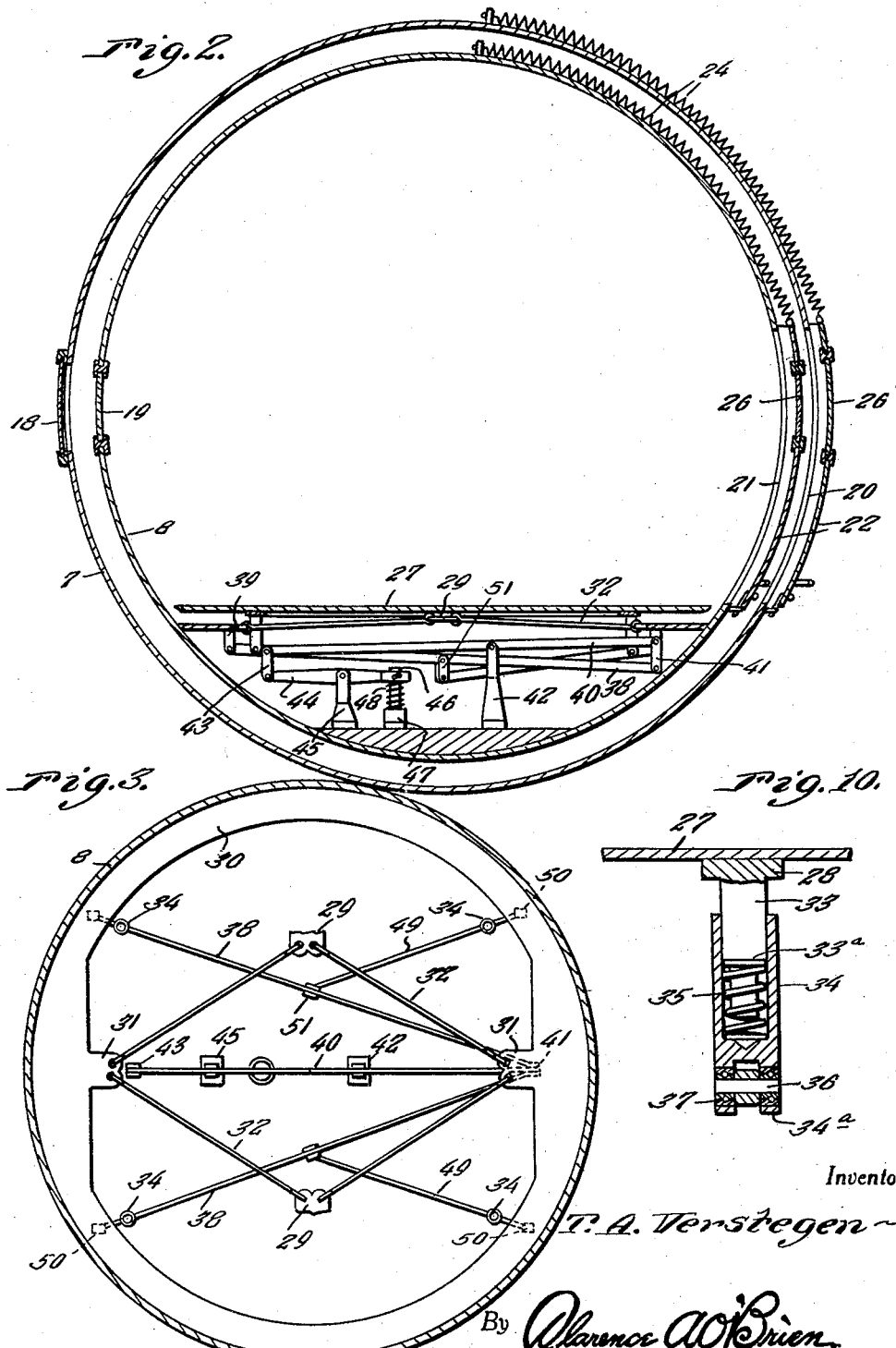

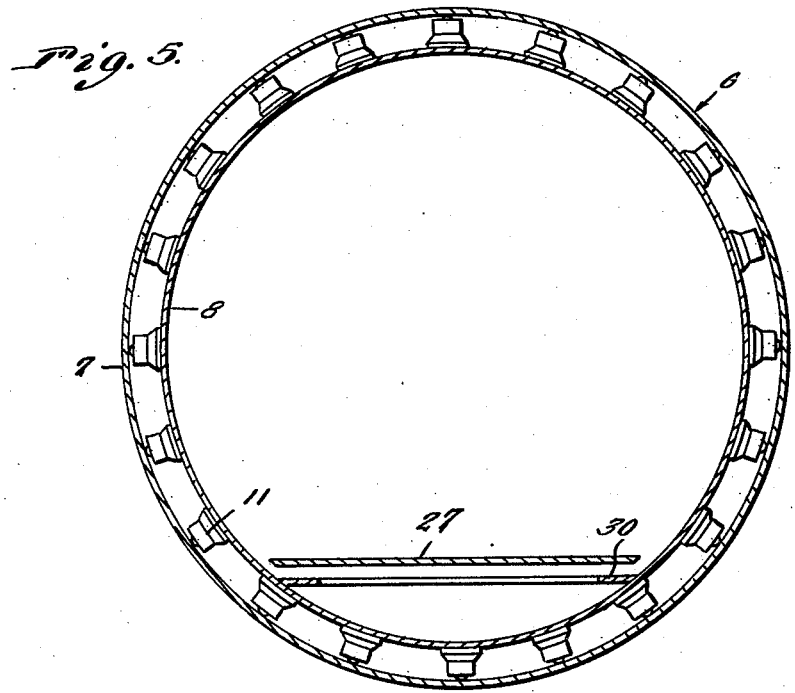

Patented Mar. 21, 1933

1,902,428

UNITED STATES PATENT OFFICE

THEODORE A. VERSTEGEN, OF BUFFALO, NEW YORK

CABIN FOR AIRCRAFT AND THE LIKE

Application filed April 29, 1932. Serial No. 608,271.

This invention relates to cabins for aircrafts, boats and the like and in accordance with the present invention a cabinet is provided which when mounted in the fuselage of an aeroplane will, through the medium of suitable stabilizing mechanism be retained at an even level no matter what position the aeroplane may assume, so that a plane equipped with a cabin embodying the features of the present invention may loop the loop, barrel roll, bank, spin or otherwise maneuver without discomfort to the passengers.

The invention together with its numerous objects and advantages will be best understood from a study of the following description, taken in connection with the accompanying drawings wherein:

Figure 1 is an elevational view of the cabin, the same being shown mounted in the fuselage of an aeroplane, and having certain parts broken away.

Figures 2, 5 and 6 are sectional views taken substantially on the lines 2—2, 5—5 and 6—6 respectively of Figure 1.

Figure 3 is a plan view of the stabilizing mechanism.

Figure 7 is a transverse sectional view through a door.

Figure 8 is a transverse sectional view through an anti-friction device.

Figure 9 is a top plan view thereof, and

Figure 10 is a fragmentary sectional elevational view of a plunger and sliding sleeve associated therewith, and illustrating certain details of construction to be hereinafter more fully referred to.

Figure 1:
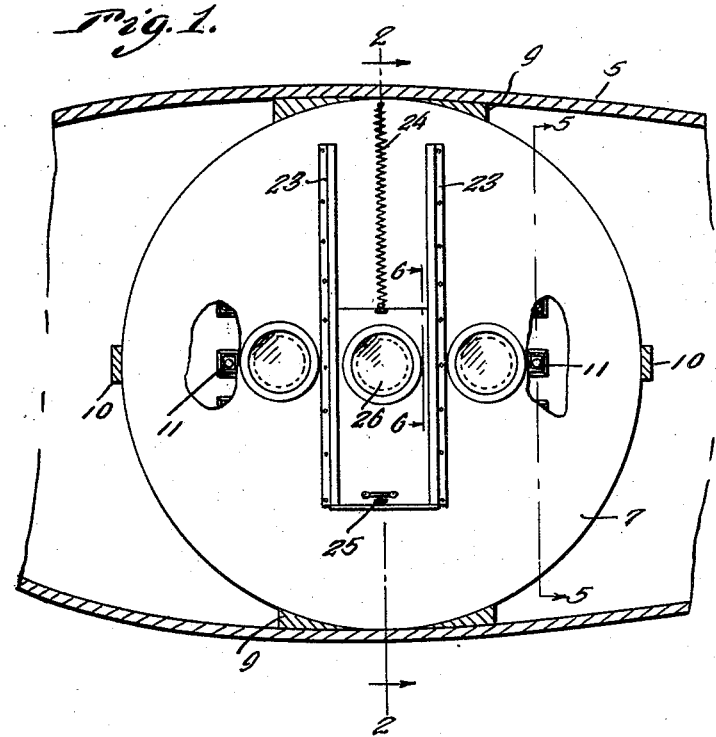
Figure 4:
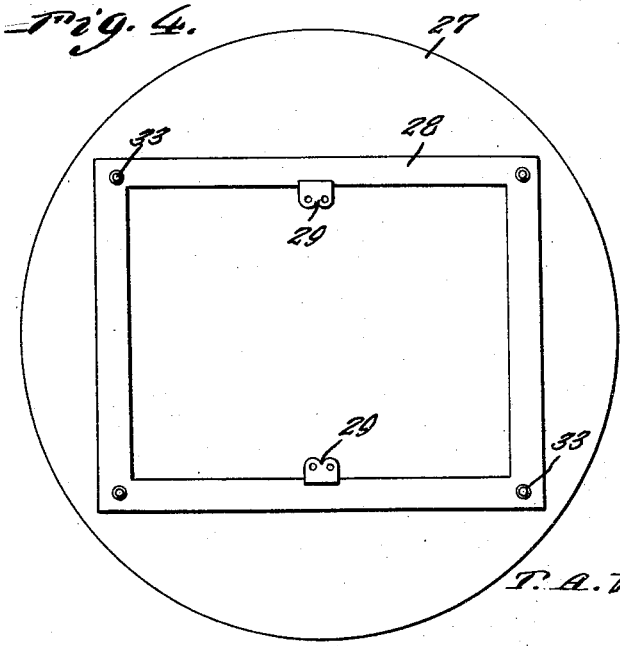
Figure 4 is a bottom plan view of the floor.

Referring more in detail to the drawings it will be seen that I have illustrated the invention as being applied in conjunction with an aeroplane, the fuselage of the areoplane being shown fragmentarily and in section, and being designated by the reference character 5.

The improved cabin structure designated generally by the reference character 6 comprises a relatively thick hollow outer spherical shell or casing 7 and an inner hollow spherical, floating shell 8 which serves for the housing of the passengers. The shells 7 and 8 may be of any suitable material, and as shown in Figure 1 the outer shell 7 is suitably mounted within the fuselage 5 against movement relative to the fuselage through the medium of upper and lower recessed blocks 9 and horizontal cross bars 10.

The inner shell 8 is considerably smaller than the shell 7 and is provided on its periphery with two relatively spaced series of anti-friction elements indicated generally by the reference character 11 which will permit of free relative movement between the shells 7 and 8.

Each of the anti-friction elements 11 comprises a boxing 12 provided at each side thereof with bolt holes 14 for accommodating bolt or similar fastening elements whereby the boxing is fixedly secured to the shell 8. Fitted within the boxing 12 are two bushings 15 that have recess portions forming a suitable seat for a ball bearing 16 that rides over the inner circumferential face of the outer spherical shell 7; and the bushings 15 are secured within the boxing 12 through the medium of bolts 17 as clearly shown in Figure 9.

The shells 7 and 8 are provided with any desired number of windows 18, 19 the windows 18 of the outer shell 9 being slightly larger than the windows 19 to compensate for relative movement between the members 7 and 8; and it will be further noted that the windows 18 are disposed outwardly relative to the circumference of the outer shell 7 so as to nowise interfere with the relative movement of the shells 7, 8, nor will the ball bearings 16 come in contact with the windows 18.

The shells 7 and 8 are provided with normally coinciding entrance and exit openings 20, 21 and for each opening there is provided a slidably mounted door 22.

Since the doors 22 are identically mounted, a detail description of one will teach the mounting of the other. For the door 20 of the outer shell 7 there is provided on the exterior of the said shell a pair of opposed relatively spaced guides 23 between which the door slides, and the door is normally urged upwardly through the medium of spring 24 that is secured to the upper end of the door and is anchored to the shell at a point on the periphery of the shell remote from the entrance and exit opening 20. At its lower edge the door is provided with suitable latch means 25 whereby the door may be readily locked in a closed position with respect to its opening 20. The door 20 is also provided with a suitable window 26.

For the cabin there is provided a floor 27 arranged within the inner shell 8 and beneath this flooring and operatively connected therewith a suitable stabilizing mechanism.

Referring more in detail to the stabilizing mechanism it will be seen that suitably secured to the under side of the floor 27 is a frame 28 and at each opposite side thereof frame 28 is provided with apertured lugs 29. Mounted within the shell 8 beneath the flooring 27 is a ring like frame 30 having lugs 31 projecting radially inwardly therefrom at diametrically opposite sides of the ring, and the lugs 31 are arranged at right angles to the lugs 29 and are connected therewith through the medium of rods 32 as shown in Figure 3.

Adjacent the corner thereof frame 28 is provided with a depending plunger 33, and each plunger 33 has slidable engagement with a socket 34 within which is arranged coil spring 35 disposed about the inner end of the plunger and at its upper end bearing against a shoulder 33a as shown in Figure 10.

Each of the socket members 34 at its bottom end is provided with a pair of ears 34a which support therebetween a pivot pin 36 the ends of which are journalled in bearings 37 provided in apertures of the gears 34a.

Links 38 are pivoted at one end as at 39 to depending pins provided on the frame 30, and adjacent said end, links 38 are also connected with the pins 36 of adjacent sleeves 34. The links 38 converge as they proceed from the pivots 39 and at their converging ends are pivotally connected together, and with one end of a link 40 as at 41. Link 40 is pivotally mounted on a standard 42, and adjacent its free end is connected by link 43 with a rocker arm 44 mounted for vertical rocking movement on a standard 45. At its free end rocker arm 45 has a loop, (pin and slot connection) with a plunger 46 mounted to reciprocate vertically in a guide 47; and a spring 48 is disposed about the plunger 46 between the guide 47 and the end of the rocker arm 44 and normally urges the latter to rotate in an anti-clockwise direction.

Relatively short links 49 are pivoted at one end as at 50 to the frame 30 and adjacent said end are connected with the pivot pins 36 of approximate sleeves 34. The ends of the links 49 remote from the pivot 50 are connected by pairs of links 51 with the links 38 intermediate the ends of the latter.

From the above description of the stabilizing device, it will be apparent that the floor 27 is supported for limited pivotal movement, it being apparent that when weight is placed on the floor the weight is automatically transferred to the center of the floor by the system of leverage employed, and further through such a system the inner shell 8 will be held steady within the outer shell 7. In this connection it will be noted that when one's weight is placed on the floor 27 upon entering the cabin, the weight is transferred through the ball bearing connection 36 to the links or levers 38, 49, which in turn by the connecting link 43 transfer the weight to the balancing lever 40 to the coil spring 48 thus distributing the weight to the center of the floor. It is to be understood that all levers are connected by ball bearing fittings assuring ease of operation.

Figure 6:
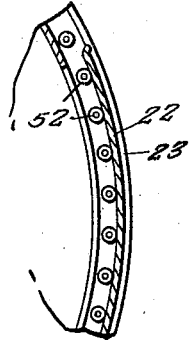

It is also apparent, that entrance into or exit from the cabin is through the door controlled openings 20, and it will be further noted that each of the doors 22 operate on anti-friction rollers or bearings 52 arranged within the guides 23 as shown in Figure 6.

It will also be apparent that the outer shell 7 may rotate in any and all directions relative to the inner shell so that when the aeroplane is maneuvered in the act of looping the loop, etc., and other stunt flying, the passengers within the inner shell 8 will remain in a perpendicular position, so that such maneuvering of the aeroplane may be accomplished without discomfort to the passengers.

Even though I have herein shown and described the preferred embodiment of the invention, it is to be understood that the same is susceptible of further changes, modifications and improvements coming within the scope of the appended claims.

Having thus described my invention, what I claim as new is:

1. In a cabin construction, inner and outer spherical shells respectively provided with doors and windows with the doors and windows of the inner shell normally coinciding with the doors and windows of the outer shell, anti-friction means disposed between said shells, and stabilizing means for said inner shell.

2. A cabin for aircraft and the like comprising inner and outer spherical shells respectively provided with doors and windows, a flooring for said inner shell, and stabilizing means for the inner shell supporting said flooring.

3. A cabin construction for aircraft and the like comprising inner and outer spherical shells, anti-friction means arranged between said shells, stabilizing means for the inner shell, and each of said shells being provided with an entrance and exit opening, a slidably mounted door for said opening, guide means for said door, and means for normally retaining the door in a closed condition.

4. In a cabin construction, inner and outer spherical shells respectively provided with doors and windows, stabilizing means for said inner shell, and two circular series of anti-friction bearings arranged on the exterior of the inner shell and having operative engagement with the interior of the outer shell.

5. In a cabin construction, inner and outer spherical shells respectively provided with doors and windows, stabilizing means for said inner shell, and two circular series of anti-friction bearings arranged on the exterior of the inner shell and having operative engagement with the interior of the outer shell, and each of said anti-friction devices comprising a boxing, a pair of recessed bushings arranged in the boxing having their recesses coinciding to provide a semi-spherical seat, and a ball bearing engaging said seat.

6. In a cabin construction for aeroplanes, inner and outer spherical shells respectively provided with doors and windows, anti-friction means interposed between said shells, a floor for said inner shell, and stabilizing means supporting said floor and including a rockably mounted balance lever, spring plunger means normally urging said lever to rotate in one direction, and linkage connecting said flooring with said balance lever.

In testimony whereof I affix my signature.

THEODORE A. VERSTEGEN.